Patented Jan. 26, 1937

2,068,872

UNITED STATES PATENT OFFICE 2,068,872

PURIFYING OF ALCOHOLS BY CONTACT CATALYSTS

Raphael Rosen, Cranford, and Francis M. Archibald, Elizabeth, N. J., assignors to Standard Oil Development Company, a corporation of Delaware No Drawing. Application June 13, 1932, Serial No. 617,040

1 Claim. (Cl. 260—156)

This invention relates to a method of purifying alcohols, particularly the secondary aliphatic alcohols of three or more carbon atoms up to and including heptyl alcohol.

These secondary alcohols, such as isopropyl to heptyl alcohols, when produced from cracked hydrocarbon naphtha, contain undesirable components which have a persistent pungent foreign odor. The cause of this odor is not definitely known but it is believed to be due to minute proportions of sulfur or/and oxygenated compounds of unknown and obscure character. The proportion of the sulfur compounds may be appreciated from the fact that the sulfur content in such alcohols varies in general from .02 to .65% and oxygenated compounds are also present in determinable traces.

An object of this invention is to reduce the sulfur content and otherwise free the resulting alcohol of its pungent foreign odor. In accordance with the present invention, the deodorification and purification of such alcohols may be accomplished by the following method:

Crude alcohols containing organic sulfur and at some times oxygenated compounds, are passed in a vapor state over a dehydrogenating catalyst such as iron sulfide, brass turnings, cobalt oxide, etc. at temperatures ranging from 350 to 600° C. and at atmospheric pressure. The crude alcohol is first heated to a temperature of 350 to 600° C. and passed through a heated tube containing the catalyst at a rate of about five volumes of alcohol per volume of catalyst per hour. Purified alcohol is then recovered suitably by distillation and prior to such distillation the alcohol is washed with an alkali. The folowing examples illustrate the procedure which may be used in carrying out the present invention:

1. Heptyl alcohol containing .632% of sulfur is heated to a temperature of about 400° C. A tube of about 6 inches in diameter and 3 feet long containing brass turnings or ferrous sulfide for a distance of about 1 foot in the center of the tube, is also heated to about 400° C. The alcohol vapors are passed through this tube at a rate of about 5 volumes of the liquid alcohol per volume of catalyst per hour and the resulting vapors are condensed. The condensate is refluxed with an alkali such as sodium hydroxide, to remove the hydrogen sulfide that has been formed, for about 2 to 3 hours, the alkali decanted and the alcohol is fractionally distilled. The resulting yield of this process is about 95% of alcohol, having a sulfur content of about .225 to .292% and free of the objectionable odor.

2. Isopropyl alcohol containing .026% sulfur is heated to a temperature of about 600° C. A tube of about 6 inches in diameter and containing brass turnings or ferrous sulfide for a distance of about 1 foot in the center of the tube is also heated to about 600° C. The heated alcohol vapors are passed through this tube at about a rate of 5 volumes of the liquid alcohol to about one volume of the catalyst per hour and the resulting vapors are condensed. The condensate is refluxed with an alkali such as sodium hydroxide, to remove the hydrogen sulfide that has been formed for about 2 to 3 hours, the alkali decanted and the alcohol is fractionally distilled. The resulting yield of this process is about 80% of alcohol having a sulfur content of about .006% free of the objectionable odor and 20% ketones.

3. Hexyl alcohol containing about .632% of sulfur is heated to about 500° C. A tube containing about 1 foot of the catalyst such as ferrous sulfide or brass turnings, is also heated to about 500° C. The alcohol vapors are passed at the rate of about two volumes of the alcohol liquid per volume of the catalyst per hour and the resulting vapors removed and condensed. The condensate is refluxed with an alkali such as sodium hydroxide for about 2 to 3 hours, the alkali is decanted and the resulting condensate is fractionated. The resulting condensate is composed of about 50 to 60% of ketones and 40 to 50% of purified alcohols. The sulfur content of the resulting ketones and alcohols is from .197 to .300%. Both the purified alcohols and ketones are free of the objectionable odor.

In each of the above cases a substantially complete removal of the objectionable odor from the alcohol and ketone was secured. The improvement of odor was marked even before the alcohol was distilled.

The following table illustrates the reduction of the sulfur content of hexyl alcohols without appreciable formation of ketones, using iron sulfide as a catalyst:

| Feed stock | Temp. °C | Velocity | | Sulfur % | | Percent ketone in reaction product* |
|---|---|---|---|---|---|---|
| | | cc./hr. | cc./catalyst | Before | After | |
| Crude hexyl alcohol | 375 | 1 | 2.5 | 0.308 | 0.199 | 4.0 |
| Do | 375 | 1 | 5.0 | 0.308 | 0.155 | 4.0 |
| Do | 425 | 1 | 2.1 | 0.308 | 0.100 | 10.0 |
| Do | 425 | 1 | 7.5 | 0.308 | 0.088 | 10.0 |

*Percentage of ketone determined by the amount soluble in a saturated sodium bisulfite solution.

Alcohols are purified by contacting with catalysts at elevated temperatures. A means of controlling the conversion of alcohols into ketones is shown which is by regulating the temperatures and length of time the alcohol vapors are in contact with the catalyst. Alcohols of lower sulfur content are obtained from alcohols of higher sulfur content. Oxygenated compounds are removed from alcohol. Ketones of lower sulfur content are obtained from alcohols of high sulfur content.

The foregoing description is merely illustrative and various changes and alternative arrangements may be made within the scope of the appended claim in which it is our intention to claim all novelty inherent in the invention as broadly as the prior art permits.

We claim:

A process of purifying aliphatic alcohols having from 3 to 7 carbon atoms which comprises subjecting vapors of alcohols to the action of brass at temperatures ranging from 350° C. to 600° C. at a rate of at least two and not over about five volumes of the alcohol liquid to one volume of catalyst per hour.

RAPHAEL ROSEN.
FRANCIS M. ARCHIBALD.